United States Patent [19]
Zell et al.

[11] 3,770,243
[45] Nov. 6, 1973

[54] VALVE BODY

[75] Inventors: Robert M. Zell; Reginald R. Maxwell, both of Detroit, Mich.

[73] Assignee: Brass-Craft Manufacturing Co., Detroit, Mich.

[22] Filed: May 4, 1972

[21] Appl. No.: 250,139

[52] U.S. Cl. .................................................. 251/366
[51] Int. Cl. ............................................... F16k 27/00
[58] Field of Search .......................... 251/366, 367; 29/157.1 R

[56] References Cited
UNITED STATES PATENTS

| | | | |
|---|---|---|---|
| 2,133,742 | 10/1938 | Forbes | 251/366 |
| 2,147,244 | 2/1939 | Cornell, Jr. | 251/366 X |
| 2,227,542 | 1/1941 | Grove | 251/366 X |
| 2,269,404 | 1/1942 | Haven et al | 251/366 X |
| 2,344,041 | 3/1944 | Hoke et al. | 251/366 X |
| 2,685,426 | 8/1954 | MacGregor | 251/366 X |
| 2,840,337 | 6/1958 | Sasserson et al | 251/367 X |
| 3,295,822 | 1/1967 | O'Bannon, Jr. et al | 251/366 |
| 3,473,785 | 10/1969 | Siepmann | 251/366 |

*Primary Examiner*—Samuel Scott
*Attorney*—Bernard J. Cantor

[57] ABSTRACT

A valve body for an under fixture plumbing valve, of the type known as a straight valve, and having end nipples and a central valve stem nipple, generally of the class of valves shown in a prior U.S. Pat. to R.M. Zell No. 3,417,450 of Dec. 24, 1968.

The valve body is improved by having transverse barrier walls whose upper parts form a valve seat; one of the walls has in its lower part an orifice communicating a holding chamber with one end nipple; the other wall has an orifice in the form of an elongated, transverse slot above the valve seat formation and communicating the holding chamber with the second end nipple.

3 Claims, 4 Drawing Figures

PATENTED NOV 6 1973  3,770,243
FIG. 1
FIG. 2
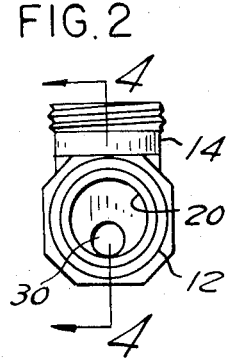
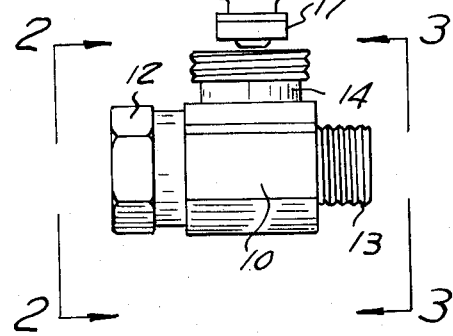
FIG. 3
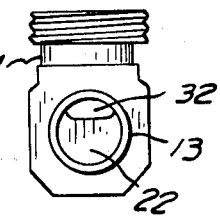
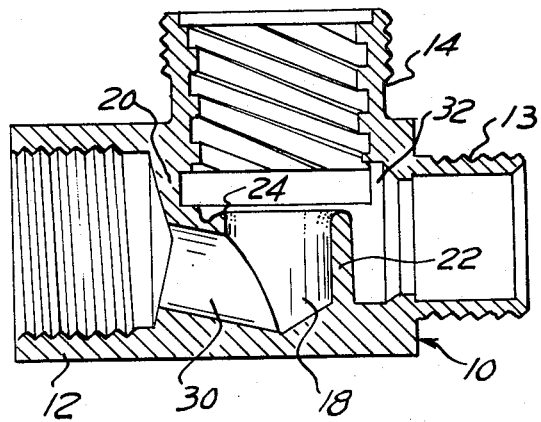
FIG. 4

VALVE BODY

GENERAL DISCUSSION

This application discloses a straight valve representing another item of a catalog line of which an earlier item is the angle valve shown in the prior U.S. Pat. No. 3,417,450.

The straight valve hereof is characterized by being extremely compact. It is formed of a one piece body extruded and drawn from a special alloy bar stock. There is eliminated by the design of the straight valve hereof, any extra stuffing box nut and fiber washer and the valve when properly made is free of leaks or weeping.

Further, it is so made as to be much easier and faster to install, the valve body being of a nature which requires less time to reach a soldering temperature, with perfect connections being established by the eveness of the all over heating of the valve body when connections are being made under heat.

The straight valve hereof is so designed that it employs the identical valve stem assembly that is used with the angle valve of said patent, the valve stems being interchangeable, and thus reducing the stock requirements of maintenance parts.

The valve stem is so designed that it is easier to assemble and disassemble requiring nothing more than the simple loosening of a bonnet nut whereupon the entire valve stem may be removed for renewal of seats, washers or packing.

Still another feature is that the valve hereof is of improved quality and design and yet can be made economically for reduction in price without sacrifice of quality.

A still further aspect of the valve body hereof is in the nature and provision of the water passing orifices in the barrier walls which separate or barrier the holding chamber of the valve and the end nipples.

One of such orifices, nominally referred to as an inlet orifice, is drilled in the barrier wall by a drill entered into the valve body through the inlet end nipple, with the drill preferably at an angle so that the inlet orifice will be in the lower part of the barrier wall and enter into the lower part of the holding chamber.

The other or nominally outlet orifice is cut in the other barrier wall in the form of an elongated transverse slot of greater width than height and of the maximum size that it is possible to provide in such barrier wall, and is located above the valve seat formation on such barrier wall and is so located that it may be formed by a tool entered into the valve body through the central or valve stem nipple and aimed at the upper part of such barrier wall above the valve seat formation and exiting towards the second end or outlet nipple.

This design provides a maximum cross section for the outlet passage or orifice that is possible to obtain within the minimum height and volume of the valve and valve body. The valve seat in such body establishes a restriction against a desired increase in the area of the outlet passage and the unique design of the valve body hereof insures maximum area for such passage with minimum height of the valve body. The elongated slot provides an effective way of increasing the area of the outlet passage consistent with minimal height of the valve body insuring a volume of flow for a small valve body equal to what might be provided by a much larger valve body having an outlet passage of conventional circular form, as contrasted with an elongated slot.

At all times an effort is made and is here successfully obtained to minimize the height of the valve body without impairing freedom of flow and reduced volume and so it is a primary object of the present invention to provide a valve body of great compactness and minimum height yet consistent with maximum flow rate.

It will, of course, be understood that the valve body hereof is characterized by design features aimed at attaining the above mentioned objectives and is of a design that provides for effective and low cost manufacture of the valve body consistent with maintanence of quality and maximum flow rate with minimal height and so an object of the present invention is to provide a valve body which can easily and effectively be manufactured.

A valve body made according to the foregoing is disclosed as a preferred embodiment in the appended drawing and will now be described by reference to such drawing.

In such drawing:

FIG. 1 is an elevation view of a valve body with a valve stem in position to be entered into the valve body;

FIGS. 2 and 3 are end views as if in the directions of the arrows 2 and 3 of FIG. 1;

FIG. 4 is an enlarged transverse section view as if on line 4—4 of FIG. 2 of the valve body per se.

DETAILED DISCUSSION

The drawing shows a valve body 10 having water passing end nipples 12–13 and a central nipple 14 for receiving a valve stem 16, with valve 17, pointing down to a holding chamber 18 defined by barrier walls 20–22 which separate chamber 18 from nipples 12–13 and which have a valve seat formation 24 on their upper surfaces.

In barrier wall 20 is an orifice 30. Orifice 30 may be formed by a cutting tool angularly entered into the valve body through nipple 12.

Barrier wall 22 is so formed that it is spaced from nipple 13. Wall 22 has an elongated transverse slot or orifice 32 above the valve seat 24 for communicating holding chamber 18 with outlet nipple 13 and so located that it can be formed by a cutting tool entered into the valve body through nipple 14 and aimed at an angle to the upper part of barrier wall 22 and exiting towards nipple 13.

Barrier wall 22 is so located that it can be formed as spaced from nipple 13 by a cutting tool axially entered into the valve body through outlet nipple 13 and operated to cut away enough of the valve body stock to form a space between the barrier wall 22 and the nipple 13.

CONCLUSION

It will be seen by now that the valve body here described and disclosed in the appended drawing as illustrating a preferred embodiment possesses all the desirable attributes and attains the desired objectives which have been described in the earlier portion of this specification. Therefore, having described the valve body and its desirable attributes, reference should be had to the claims which follow for a determination of the scope of the invention for which protection is sought by this application.

We claim:

1. A straight valve comprising:

a one-piece, generally T-shaped valve body, with the leg of the T-shape forming a valve stem nipple, and the opposite ends of the head forming entrance and exit nipples, respectively;

a blind central hole extending through said leg to roughly the center line of said head and then continuing at a smaller diameter almost through the head to a blind end just within the head, to thereby form a large diameter internally threaded stem opening and a smaller diameter fluid holding chamber, and with an annular shoulder formed at the junction of the larger and smaller diameter hole portions forming a valve seat;

a blind exit end hole, axially aligned with the head central axis and extending from the free end of the head exit toward the center of the valve body and terminating just before reaching the leg smaller hole portion, but inwardly of the diameter of the leg larger hole portion and thus penetrating the inner end of the leg stem opening to form an exit barrier between the holding chamber and the exit hole and a transversely aligned slot above the exit barrier and valve seat communicating between the leg stem opening and the otherwise blind inner end of the exit hole;

and a blind entrance hole, axially aligned with the head central axis and terminating in a blind end located outwardly of the diameter of the leg larger hole portion to form an entrance barrier between both of the leg hole portions and the entrance hole;

said central hole having an annular undercut located at said annular shoulder and having a diameter larger than the diameter of said central hole, and said exit end hole having an annular undercut located at said exit barrier generally perpendicular to said central hole undercut, communicating therewith and forming a passage between said fluid chamber and said exit end hole;

whereby liquid flows into the valve body through said entrance hole and then flows therefrom into said fluid holding chamber, around said exit barrier and through said passage and finally through the exit hole in a wave-like pattern.

2. The straight valve defined in claim 1 characterized in that said entrance hole includes a small diameter inlet hole extending at an acute angle relative to the leg hole axis from the blind end of said entrance hole to the blind end of the leg hole smaller diameter portion for communicating the entrance hole with said holding chamber.

3. A construction as defined in claim 2, and with the blind end of the leg smaller diameter hole being sloped downwardly between the center thereof relative to the exit barrier for guiding liquid flow over the exit barrier.

* * * * *